United States Patent [19]

Ishii et al.

[11] Patent Number: 4,871,503

[45] Date of Patent: Oct. 3, 1989

[54] METHOD FOR PRODUCING MOLDED PRODUCTS HAVING UNEVENNESS TUNED WITH INK PATTERNS

[75] Inventors: Taiji Ishii, Tokyo; Masayuki Shibata, Miyoshi, both of Japan

[73] Assignee: Dai Nippon Insatsu Kabushiki Kaisha, Japan

[21] Appl. No.: 15,094

[22] Filed: Feb. 13, 1987

[30] Foreign Application Priority Data

Feb. 14, 1986 [JP] Japan ................... 61-30537
Jul. 31, 1986 [JP] Japan ................... 61-181171
Sep. 2, 1986 [JP] Japan ................... 61-206445

[51] Int. Cl.[4] ............ B29C 43/04; B29C 51/14; B29C 65/02
[52] U.S. Cl. ................... 264/248; 264/132; 264/322; 264/327
[58] Field of Search ............ 264/248, 132, 327, 322

[56] References Cited

U.S. PATENT DOCUMENTS 4,711,690 12/1987 Haghiri-Tehrani ............ 264/132 X

FOREIGN PATENT DOCUMENTS 60-193637 10/1985 Japan .................. 264/132

*Primary Examiner*—Jan H. Silbaugh
*Assistant Examiner*—Kelley M. Sidwell
*Attorney, Agent, or Firm*—Arnold, White & Durkee

[57] ABSTRACT

A process for producing 2 press molded laminate including at least two thermoplastic resin layers and an ink pattern layer, wherein inner unevenness is provided on the interface of the thermoplastic resin layers tuned with the ink pattern, wherein the unevenness can be viewed through at least one of the surfaces of the press molded laminate. The molded product visually provides stereoscopic appearance due to tuning the inner unevenness with the ink pattern.

8 Claims, 1 Drawing Sheet

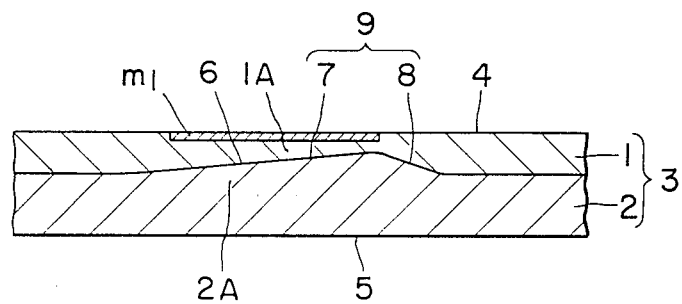
F I G. 1
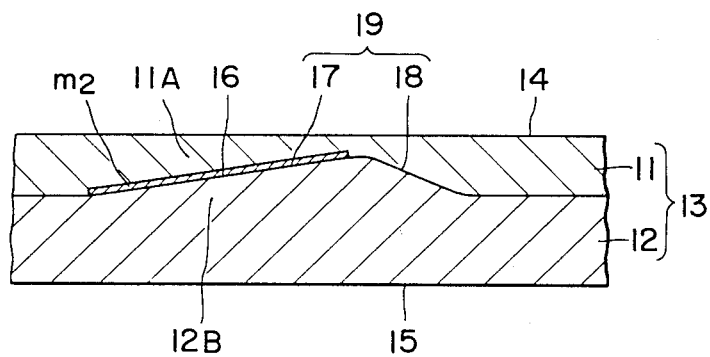
F I G. 2

METHOD FOR PRODUCING MOLDED PRODUCTS HAVING UNEVENNESS TUNED WITH INK PATTERNS

BACKGROUND OF THE INVENTION

This invention relates to a resin molded product having inner unevenness tuned with an ink pattern such as a design which can be used in producing products such as decorative sheets, synthetic resin tiles, underlaying sheets, desk mats, and credit cards.

A synthetic resin molded product having embossment (unevenness) tuned with a pattern provides a stereoscopic or three-dimensional feeling to the pattern by tuning the unevenness with the pattern. Accordingly, the appearance of the molded product provides originality, a real feeling and the like.

This synthetic resin molded product having embossment (unevenness) tuned with the pattern can be obtained by press molding a synthetic resin with a caul having uneven surfaces in a press molding step while embossing a molded product. Alternatively, the synthetic resin molded product having embossment (unevenness) tuned with the pattern can be obtained by press molding a synthetic resin with a caul having uneven surfaces and thereafter embossing the resulting press molded product. The synthetic resin molded products having embossment (unevenness) tuned with the pattern which have been produced by these processes have embossment on the surface thereof.

The molded products having on the surface thereof embossment (unevenness) tuned with the pattern have the following drawbacks: The surface of the molded products is clogged with contamination, and the removal of the contamination is difficult. Further, the molded products are poor in originality, and have poor abrasion resistance. Furthermore, in the aforementioned processes for mechanically forming embossment, it is necessary to prepare respective molds for different patterns. Tuning the pattern with unevenness is difficult and a complete real feeling is not always obtained.

SUMMARY OF THE INVENTION

A general object of the present invention is to provide a press molded laminate which can visually provide a complete real feeling and a stereoscopic feeling from its appearance by tuning inner unevenness with a pattern.

Another object of the present invention is to provide a process for producing a press molded product having inner unevenness completely tuned with a pattern without requiring any step for mechanically forming embodiment.

A further object of the present invention is to provide an intermediate capable of easily producing a molded product having inner unevenness completely tuned with a pattern by simply press molding.

A still further object of the present invention is to provide a press molded product having unevenness completely tuned with a pattern wherein it has smooth surfaces to which contaminants are not substantially deposited.

These and other objects of the present invention will become apparent from the following detailed description and the accompanying drawings.

According to the present invention, a press molded laminate having inner unevenness tuned with an ink pattern is a press molded laminate comprising at least two thermoplastic resin layers and an ink pattern layer wherein inner unevenness is provided at the interface of said thermoplastic resin layers tuned with said ink pattern, and wherein the unevenness can be viewed through at least one of the surfaces of the molded laminate.

In a preferred embodiment of the present invention, at least one of the thermoplastic resin layers can be formed from a resin with lustrous surface, and the remaining layer(s) can be formed from a transparent resin.

In a preferred embodiment of the present invention, further embossment can be provided on the surface of the press molded laminate in addition to inner unevenness.

In a preferred embodiment of the present invention, a protective layer can be also provided on the surface of the press molded product.

According to the present invention, a process for producing a press molded laminate having inner unevenness tuned with an ink pattern comprises the steps of:

applying pressure, to a molding stock obtained by stacking at least two thermoplastic resin layers and an ink pattern layer, in a direction substantially perpendicular to said layers at a heating temperature at which the hot melt behavior of said thermoplastic resin layers is different from that of said ink pattern layer, thereby melting the whole or part of the interface between said thermoplastic resin layers and vicinity thereof;

compressing said molding stock until the total thickness of said thermoplastic resin layers is decreased to from 95% to 40%, preferably from 90% to 40%, of the thickness at the start of pressurization; and cooling the compressed product, thereby forming inner unevenness at the interface of said thermoplastic resin layers tuned with said ink pattern wherein said unevenness can be viewed through at least one of the surfaces of said molded laminate.

In a preferred embodiment of the present process, said ink pattern layer of the stacked molding stock can be formed from at least two ink compositions wherein their hot melt behaviors during pressurization are different from one another.

In another preferred embodiment of the present process, said pressurization can be carried out by means of pressure plates directed to the surfaces of the molding stock, thereby preventing misalignment between the surface of said pressure plate and the surface of said molding stock under pressure.

In another preferred embodiment of the present process, misalignment between the surface of said pressure plate and the surface of said molding stock during pressurization can be prevented by interposing a (polyethylene terephthalate) film between the surface of said pressure plate and the surface of said molding stock.

In another preferred embodiment of the present process, in order to promote the formation of unevenness at the interface of said thermoplastic resin layers tuned with said ink pattern, the generation of misalignment between said thermoplastic resin layers can be also promoted during pressurization.

In a further preferred embodiment of the present process, said pressurization can be also carried out by continuously feeding said molding stock between rotating endless belts.

In a preferred embodiment of the present process, the position of the ink pattern layer in said molding stock can also deviate from the center of the thickness of said molding stock.

According to an intermediate of the present invention, a laminating material comprises an anti-deviation film provided on at least one of the surfaces of a molding stock obtained by stacking at least two thermoplastic layers and an ink pattern layer, wherein said thermoplastic resin layers and ink pattern layer of said laminating material exhibit different hot melt behaviors at a heating temperature when pressure is applied to the laminating material in a direction substantially perpendicular to said layers; and wherein said laminating material can provide a press molded product by applying pressure to the laminating material at said heating temperature to melt the whole or part of the interface between said thermoplastic resin layers and vicinity thereof, compressing said molding stock until the total thickness of said thermoplastic resin layers is decreased to from 95% to 40% of the thickness at the start of pressurization, and then cooling the compressed product, said press molded product having unevenness at the interface of said thermoplastic resin layers tuned with said ink pattern resin layers wherein said unevenness can be viewed through at least one of the surfaces of said molded product.

BRIEF DESCRIPTION OF THE DRAWING

In the drawing:

FIG. 1 is a fragmentary enlarged sectional view showing one embodiment of a press molded product having inner unevenness tuned with an ink pattern according to the present invention; and FIG. 2 is a similar view showing another embodiment of a press molded product having inner unevenness tuned with an ink pattern according to the present invention.

DETAILED DESCRIPTION OF THE INVENTION

Press Molded Laminate

A press molded laminate according to the present invention comprises at least two thermoplastic resin layers and an ink pattern layer.

Examples of thermoplastic resins from which the thermoplastic resin layers are produced and which can be used in the present invention include cellulosic resins, acetates, polyethylene, polypropylene, polyesters, polyvinyl chloride, polyvinylidene chloride, polystyrene, polycarbonates, polyvinyl alcohol, polyamides, fluoroplastics, chlorinated polyolefins, ethylene-vinyl acetate copolymers, ABS resins, acrylic resins and polyacetals. Of these thermoplastic resins, a preferred thermoplastic resin is polyvinyl chloride, particularly from the standpoints of its abrasion resistance, flame retardancy, water resistance, thermal weldability, printability and economy.

The thermoplastic resin layers of the press molded laminate according to the present invention are composed of the same layer or two or more different layers.

When at least one of the thermoplastic resin layers is formed from a resin layer exhibiting sheen or luster, an embossing effect tuned with a colored ink pattern layer can be increased. The thermoplastic resin layer having sheen is a lustrous layer containing a lustrous material such as an aluminum pigment, a bronze pigment or a pearllike pigment. This lustrous layer can be obtained by solid printing or coating a printing ink composition containing a lustrous material onto a thermoplastic resin sheet having transparency. Alternatively, the lustrous layer can be obtained by incorporating a lustrant in a resin. In the present invention, the preferred lustrous resin layer is a sheet having a lustrant incorporated therein and having a thickness of at least 10 micrometers from the standpoint of its uniformity. A sheet having a lustrant incorporated therein and having a thickness of the order of about 70 micrometers is more preferable from the standpoint of its handling. When the lustrous layer is provided at the outside of the ink pattern layer, it is desirable that the lustrous layer be transparent so that the inner pattern can be viewed through it.

The ink pattern layer of the press molded laminate can be provided on at least one of the thermoplastic resin layers by a gravure, screen, offset, flexagraphic, or ink jet printing method. This ink pattern layer has a hot melt behavior different from that of the thermoplastic resin layer having the ink pattern layer formed thereon. For example, the ink pattern layer has a melting point different from that of the thermoplastic resin layer.

In addition to the ink pattern layer and the thermoplastic resin layers, the press molded laminate of the present invention can comprise one or more optional layers of a material selected from thermosetting resins, papers, nonwoven fabrics, cloths, glass cloths, glass plates, wooden plates, metal plates and uncompressed thermoplastic resins.

An embodiment of a press molded laminate of the present invention will be described with reference to the attached drawing.

FIG. 1 shows one embodiment of a press molded laminate having inner unevenness tuned with an ink pattern. A sheet-shaped press molded laminate 3 of this example comprises a first thermoplastic resin layer 1 having an ink pattern layer m1 provided on the upper surface thereof, and a second thermoplastic resin layer 2 provided on the lower surface of the first thermoplastic resin layer 1. In the press molded laminate 3 of the embodiment, its upper and lower surfaces, 4 and 5, are each smooth surfaces At the interface 6 of the portion 1A of the first thermoplastic resin layer close to the ink pattern layer and the portion 2A of the second thermoplastic resin layer which is in contact with the portion 1A, there is formed a gentle slope 7 in a convex arc-shaped face 9 comprising the gentle slope 7 and a steep slope 8 wherein the convex arc-shaped face 9 is present in the form of a convex arc toward the ink pattern layer m1 described above in a direction of the thickness of the press molded laminate 3.

FIG. 2 shows another embodiment of a press molded laminate having inner unevenness tuned with an ink pattern according to the present invention. A sheet-shaped press molded laminate 13 cf this embodiment comprises a first thermoplastic resin layer 11, a second thermoplastic resin layer 12 provided on the lower surface of the first thermoplastic resin layer, and an ink pattern layer m2 interposed between the resin layers 11 and 12. In this press molded laminate 13, its upper and lower surfaces are each smooth surfaces. At the interface 16 of the thermoplastic resin layers 11 and 12 having the ink pattern layer m2 interposed therebetween, there is formed a gentle slope 17 in a convex arc-shaped face 19 comprising the gentle slope 17 and a steep slope 18 wherein the convex arc-shaped face 19 is present in the form of a convex arc in a direction of the thickness of the press molded laminate 13.

The press molded laminate according to the present invention is not limited to the examples described above, but various modifications can be made. For example, further unevenness (embossment) can be provided on the outer surface of the press molded laminate. The press molded laminate of this embodiment can be obtained by a conventional embossing method such as an after-embossing method wherein the press molded laminate is embossed, another method wherein an embossed release paper is interposed, a further method wherein embossment is formed by means of pressure plates.

A protective layer having abrasion resistance or weatherability can be also provided on the outer surface of the press molded laminate. The press molded laminate of this modified embodiment can be obtained by an after-coating method wherein a protective material having abrasion resistance or weatherability is coated onto the surface of the molded product, or by another method wherein an abrasion resistant agent or ultraviolet absorber is incorporated in the facial thermoplastic resin layer.

Production

The present process is a process for producing a press molded product having inner unevenness tuned with an ink pattern. The present process comprises the steps of:

(a) applying pressure, to a molding stock obtained by stacking at least two thermoplastic resin layers and an ink pattern layer, in a direction perpendicular or substantially perpendicular to said layers at a heating temperature at which the hot melt behavior of said thermoplastic resin layers is different from that of said ink pattern layer, thereby melting the whole or part of the interface of said thermoplastic resin layers and vicinity thereof;

(b) compressing said forming stock until the total thickness of said thermoplastic resin layers is decreased to from 95% to 40%, preferably from 90% to 40%, of the thickness at the start of pressurization, and cooling the compressed product, thereby forming unevenness at the interface of said thermoplastic resin layers tuned with said ink pattern wherein said unevenness can be viewed through at least one of the surfaces of said molded laminate.

The thermoplastic resin layer, the ink pattern layer and other materials which are used in this process have been already described in the paragraph "Press Molded Laminate".

Examples of the patterns of the ink pattern layer used in the present process include abstract patterns; natural patterns such as animals, plants, grains, stones and corks; letters, symbols and combinations thereof.

In the present invention, a portion of the pattern or a portion of an ink composition present in the total surface of the pattern can be formed from at least two ink compositions wherein the hot melt behaviors thereof during pressurization are different from one another, for example, ink compositions wherein the softening points thereof are different from one another. In such an embodiment, the extent of unevenness can be varied depending upon the patterns.

In the present invention, in addition to the ink pattern layer exhibiting a hot melt behavior different from that of the thermoplastic resin layer, a second ink pattern layer exhibiting a hot melt behavior identical or similar to that of the thermoplastic resin layer can be included in the molding stock. For example, when the difference in hot melt behaviors is the difference in melting points, it is preferable that the difference between the melting point of the second ink pattern layer (vehicle) and the melting point of the thermoplastic resin layer be less than about 5° C.

In the present invention, the molding stock is heated to a temperature at which the hot melt behavior of the thermoplastic resin layer is different from that of ink pattern layer. When the difference in hot melt behaviors is a melting point, a desired effect can be obtained provided that the difference between the melting point of the thermoplastic resin layers and the melting point of the ink pattern layer, particularly the melting point of the vehicle of the ink pattern layer is at least 5° C. When the hot melt behaviors of the thermoplastic resin layers which are in contact with one another are different, a press molded laminate exhibiting a higher embossing effect can be obtained. While the upper limit of the difference between the melting point of the thermoplastic resin layers and the melting point of the vehicle of the ink pattern layer is not restricted, it is substantially preferable that the upper limit be about 40° C. from the standpoints of handling and the raw materials.

In the present process, the position of the ink pattern layer in the molding stock preferably deviates from the center of the thickness of the molding stock. This is because the formation of inner unevenness at the interface is promoted when the molding stock is subjected to heat and pressure.

Pressure is applied to the molding stock before, during or after heating. For example, pressurization can be carried out by inserting the molding stock between pressure plates and applying specific pressure to the plates. Accordingly, pressurization can be carried out by discontinuous pressing which is a conventional press molding method, or by another method of continuously pressing to obtain an elongated press molded product, such as roll pressing, roll laminating or rotary pressing. A preferred pressing method is a pressing method of continuously feeding a molding stock between rotating endless belts.

In the present invention, a pattern having a stable and remarkable embossing effect can be obtained by melting the whole or part of the interface between said thermoplastic resin layers and vicinity thereof under pressure at the heating temperature, and compressing said forming stock until the total thickness of said thermoplastic resin layers is decreased to from 95% to 40%, preferably from 90% to 40%, and more preferably from 60% to 80% of the thickness at the start of pressurization.

If the total thickness of the thermoplastic resin layers at the start of cooling is more than 95% of the thickness at the start of pressurization, inner unevenness will be insufficient. If the molding stock is compressed to a thickness of less than 40%, the resulting pattern of the ink pattern layer tends to occur disturbance.

In pressurizing, when the pressing pressure is maintained at a constant level throughout the pressurization cycle, i.e., when the initial maximum pressure is retained, the time required for decreasing the total thickness of the thermoplastic resin layers to 90% to 40% of the thickness at the start of pressurization is shortened to about ½ as compared with the case where the pressing pressure is gradually decreased in the pressurization cycle.

In pressurizing in the present invention, an unevenness effect can be increased by using pressure plates directed to the molding stock to carry out pressurization to prevent the deviation between the surface of the pressure plates and the surface of the molding stock during pressurization. Examples of the methods of preventing deviation include a method wherein unevenness is provided on the pressure plates, another method wherein the pressure plates are coated with a resin, another method wherein a film is laminated on the pressure plates, another method wherein at least one anti-deviation film is inserted between the surface of the pressure plates and the surface of the molding stock, a further method wherein anti-deviation projections are provided at the periphery of the surface of the pressure plates, a still further method wherein an anti-deviation film is tentatively adhered to the surface of the molding stock by heat or weak tackiness.

Films used in the method of preventing deviation by inserting at least one anti-deviation film between the surface of the pressure plates and the surface of the molding stock have such heat resistance that the films do not thermally weld to the thermoplastic resin layers and the metal mold for press molding, no or little elongation during the heating process, good releasability and excellent surface strength. Examples of the films having such properties include films of materials such as polyesters, nylon, fluoroplastics, and vinylon. This anti-deviation film is separated and removed from the molded product after press molding. The thickness of the anti-deviation film is, for example, from about 6 to about 100 microns.

In the present invention, a laminating material comprising a molding stock having at least one anti-deviation film provided on at least one of the surfaces of the molding stock can be used as an intermediate for the present process.

An ink pattern layer can be provided on the surface of the anti-deviation film wherein said surface faces to the molding stock. This ink pattern layer is transferred to the surface of the molding stock when it is subjected to pressure and heat.

In order to form embossment and to prevent any deviation, an embossed plate having fine unevenness groups provided on the surface thereof can be used. Press molding can be carried out by using the embossed plate so that its surface having the fine unevenness groups comes into contact with the surface of the molding stock. In the present invention, metallic plates, melamine plates or the like having matte fine unevenness groups such as delustering patterns provided on the surface thereof can be used as the embossed plate.

On the other hand, in order to promote the deviation of the interface of the thermoplastic resin layers tuned with the ink pattern, a frame can be also provided around the entire peripheral side edge of the metal mold for press molding. It is desirable that the height of the frame is from about 10% to about 20% of the thickness of the molding stock. The deviation at the interface between the thermoplastic resin layers can be promoted by using rolls having different peripheral speeds in roll pressing; by pressing with pressure plates having a pressure surface which is not perpendicular to a direction of pressurization; or by using pressure plates having large unevenness.

While the mechanism by which inner unevenness is formed at the interface of the thermoplastic resin layers tuned with the ink pattern according to the present process is not entirely apparent, it will be described. However, the following explanation is given in order to provide better understanding of the present invention. It never limits the scope of the present invention.

The mechanism is complicated. The mechanism in the case where the melting temperature of the resin vehicle of the ink pattern is lower than that of the resin of the thermoplastic resin layers in the press molded laminate of the embodiment shown in FIG. 2 will be described as a representative.

After the press molding is started, the temperature of the molding stock is raised. The portion of the ink pattern layer first melts. There is realized an intermediate stage wherein the horizontal flow resistance of the molding stock decreases at the portions 11A and 12B of the thermoplastic resins which are below and above the molten ink pattern layer or other portions. The whole is softened by continuing press molding. The whole is placed under pressure, and therefore the horizontal flow of the thermoplastic resin in the molding stock starts. In this flow, the flow speed of the portion near press platens (pressure plates) is lower than that of the portion remote from the press platens and therefore the distribution of the flow speed occurs in a direction of the thickness of the molding stock. This flow is promoted because resistance to horizontal flow at the interface between the thermoplastic resin layers which are in contact with the ink pattern layer is decreased. The pressure of the portion exhibiting a higher flow speed is even more increased. It is thought that inner unevenness is formed at the interface between the upper and lower thermoplastic resin layers which are in contact with the ink pattern layer. As can be understood from the mechanism of the formation of the inner unevenness, such inner unevenness is visually inspected as if it is formed by tuning with the ink pattern. The mechanism for forming inner unevenness in other embodiments is substantially the same as the mechanism as described above, although there are more or less differences.

EXAMPLES

In order to indicate more fully the nature and utility of this invention, the following examples are set forth, it being understood that these examples are presented a illustrative only and are not intended to limit the scope of the invention. All "parts" used herein are by weight unless otherwise specified.

Example A-1

A decorative sheet was produced by forming a granite-like ink pattern of a methacrylate ink composition (the average polymerization degree $\overline{P}$ of the resin being 400) on the back surface of a transparent polyvinyl chloride (PVC) sheet (the average polymerization degree $\overline{P}$ of the resin being 1,100, the thickness of the sheet being 0.25 mm, and the content of a plasticizer being 30 PHR) by a gravure printing method.

A pearl clear film produced by incorporating a pearl essence (3PHR) in PVC (the average polymerization degree $\overline{P}$ of the resin being 1,100, the thickness of the film being 0.07 mm, and the content of a plasticizer being 23 PHR) was used as an intermediate resin layer.

Extruded sheets having the following composition (the thickness thereof being 0.5 mm) were used as PVC substrate sheets.

| Component | parts |
| --- | --- |
| Vinyl chloride-vinyl acetate copolymer | 100 |
| Plasticizer (DOP) | 30 |
| Titanium dioxide | 15 |
| Calcium bicarbonate | 300 |
| Tin-type stabilizer | 4 |

The aforementioned sheets and film were stacked in order of decorative sheet/pearl clear film/three substrate sheets to form a molding stock. The molding stock was inserted between hot plates at 150° C. using chrome plated iron plates having a thickness of 2 mm as cauls. The whole was press molded under an initial pressure of 50 kg/cm$^2$. After 4 minutes, the pressure was reduced to 20 kg/cm$^2$. At this time, water cooling was started and the hot plates were cooled to 25° C. for 15 minutes. On water cooling, the pressing pressure was maintained at 10 kg/cm$^2$.

In the molding stock described above, the PVC substrate sheets are those which do not contribute to compression during press molding.

The thickness of the resulting synthetic resin molded product (i.e., the press molded product) was 1.70 mm, and the back and front surfaces of the press molded product were each smooth surfaces. The front surface layer was a transparent layer. In the granite-like ink pattern layer formed via the transparent layer, only the print ink portion protected upwardly in the form of a convex. The press molded product was original as a vinyl chloride tile exhibiting inner unevenness tuned with the ink pattern.

When the cross section of the press molded product described above was observed by means of a magnifier, it was confirmed that the interface between the ink pattern layer and the pearl clear film layer corresponded to a gentle slope in a convex arc-shaped face comprising gentle and steep slopes which exhibited a convex arc shape toward the ink pattern layer described above.

Example A-2

A sheet having the same structure as that of the decorative sheet described in Example A-1 was used as a decorative sheet.

A pearl essence/calcium carbonate-containing pearlescent PVC film (the thickness of the film being 0.10 mm, the content of a plasticizer being 5 PHR, and $\overline{P}=1,100$) was used as an intermediate resin layer.

A transparent PVC film ($\overline{P}=1,100$, the thickness of the film being 0.25 mm and the content of a plasticizer being 30 PHR) was used as a substrate.

The sheet and films described above were staked in order of decorative sheet/lustrous PVC film/substrate film. The stack was press molded under the conditions as described in Example A-1 except that the heating time was 2 minutes. Thus, a synthetic resin molded product having a thickness of 0.48 mm was obtained.

The back and front surfaces of the resulting synthetic resin molded product were smooth surfaces Inner unevenness tuned with the ink pattern was introduced the ink pattern layer formed via the front surface layer, i.e., the transparent layer. The synthetic resin molded product had excellent design characteristics.

The synthetic resin molded product described above was suitable for use as an underlaying sheet.

When the cross section of the press molded product described above was observed by means of a magnifier, it was confirmed that the interface of the ink pattern layer and the sheet layer for the intermediate resin layer corresponded to a gentle slope in a convex arc-shaped face comprising gentle and steep slopes which exhibited a convex arc shape toward the ink pattern layer described above.

Example A-3

A decorative sheet was produced by applying a screen printing ink composition (H Series Halftone Ink manufactured by Jujo Kako, K. K.) to the surface of a transparent PVC film (the thickness of the film being 0.1 mm and the content of a plasticizer being 20 PHR, and $\overline{P}=1,100$ by a flat screen printing method to form a stained glass-like ink pattern layer thereon.

A substrate sheet was produced by applying an ink composition containing a pearl essence to the surface of a transparent PVC film (the thickness of the film being 0.1 mm, the content of a plasticizer being 20 PHR, and $\overline{P}=1,100$ by means of a Mayer bar #26 to form a coating layer of thickness of 10 microns thereon.

The decorative sheet and the substrate sheet were stacked. The stack was press molded under the same conditions as described in Example A-2 to obtain a sheet-shaped synthetic resin molded product having a thickness of 0.13 mm.

When the resulting synthetic resin molded product, i.e., the synthetic resin sheet was affixed to a glass plate with an adhesive, all of the glass plate became translucent, and the ink pattern layer exhibited embossment tuned with said ink pattern. A cut glass-like stained glass appearance was obtained.

When the cross section of the press molded product described above was observed by means of a magnifier, it was confirmed that in the interface between the decorative sheet layer and the substrate sheet layer, the interface between the portion of the decorative sheet layer which was in contact with the ink pattern layer in the direction of the thickness of the press molded product and the portion of the substrate sheet layer which was in contact with said portion of the decorative sheet layer corresponded to a gentle slope in a convex arc-shaped face comprising gentle and steep slopes which exhibited a convex arc shape toward the ink pattern layer described above.

Example A-4

(a) A transparent acrylic resin plate having a thickness of 1 mm, (b) a decorative sheet obtained by applying a vinyl chloride-vinyl acetate copolymer/acrylic resin ink composition to the surface of a transparent PVC film having a thickness of 0.07 mm (the content of a plasticizer being 12 PHR, and $\overline{P}$ 800) by a gravure printing method to form an ink pattern layer having solid letter print and having abstract patterns exhibiting gradation, (c) a clear PVC pearl film containing mica and having a thickness of 0.09 (the content of a plasticizer being 23 PHR, and $\overline{P}=1,100$), and (d) a milk white PVC film having a thickness of 0.07 mm (the content of a plasticizer being 18 PHR) were sequentially stacked to prepare a molding stock. The molding stock was inserted between hot plates at 150° C. using chrome plated iron plates of thickness of 2 mm as cauls, and press molded under an initial pressure of 50 kg/cm$^2$. After 5 minutes, the pressure was reduced to 10 kg/cm$^2$. At this time, water cooling was started. Water cooling was continued under the same conditions as described in Example A-1 to obtain a synthetic resin molded product.

In the resulting synthetic resin molded product, i.e., the acrylic decorative laminate, the ink pattern layer comprising abstract patterns formed via the transparent acrylic resin layer projected upwardly and was relieved. Embossment tuned with the ink pattern was introduced into the acrylic decorative laminate.

The resulting synthetic resin molded product was extremely rich in originality, had high design characteristics, and was suitable for use in decorative illumination signs.

When the cross section of the press molded product described above was observed by means of a magnifier, it was confirmed that, at the interface between the decorative sheet layer and the clear pearl PVC film layer, the interface between the portion of the decorative sheet layer which was in contact with the ink pattern layer in the direction of the thickness of the press molded product and the portion of the clear pearl PVC film layer which was in contact with said portion of the decorative sheet layer corresponded to a gentle slope in a convex arc-shaped face comprising gentle and steep slopes which exhibited a convex arc shape toward the ink pattern layer described above.

Example B-1

An anti-deviation film comprising a polyethylene terephthalate film of a thickness of 25 microns was superposed on the surface of the decorative sheet of the stack (decorative sheet/clear pearl sheet) described in Example A-1, and the whole was hot-pressed at a temperature of 130° C. under a pressure of 1 kg/cm$^2$ to obtain a laminating material for an intermediate of a press molded product.

The laminating material described above was subjected to press molding under the same conditions as described in Example A-1 together with a PVC substrate sheet. The whole was cooled to 25° C. and then the anti-deviation film was peeled off to obtain a press molded product. Vinyl chloride tiles exhibiting a remarkable embossing effect were obtained.

Example B-2

An anti-deviation film comprising a polyethylene terephthalate film of thickness of 25 microns was superposed on the surface of the decorative sheet of the molding stock described in Example A-2. The whole was hot-pressed at a temperature of 130° C. under a pressure of 1 kg/cm$^2$ to obtain a laminating material for an intermediate of a press molded product.

The laminating material described above was subjected to press molding as in Example A-2 and cooled to 25° C. When the anti-deviation film was peeled off to obtain a press molded product, the press molded product exhibited a more remarkable embossing effect.

Example C-1

Anti-deviation films comprising polyethylene terephthalate films of thickness of 25 microns were affixed to the back and front surfaces of the same molding stock as described in Example A-1 to form a stack. The stack was inserted between hot plates at 150° C. using chrome plated iron plates of thickness of 2 mm as cauls, and press molded under an initial pressure of 50 kg/cm$^2$. After 4 minutes, the pressure was reduced to 20 kg/cm$^2$. At this time, water cooling was started, and the hot plates were cooled to 25° C. for 15 minutes. The anti-deviation film was peeled off to obtain a press molded product, i.e., a desired product. On water cooling, the pressing pressure was maintained at 10 kg/cm$^2$. In the molding stock described above, the PVC substrate sheets are layers which do not contribute to compression during press molding.

The resulting press molded product, i.e., the thermoplastic resin molded product exhibited a more remarkable embossing effect than that of the press molded product described in Example A-1.

Example C-2

An anti-deviation film comprising a polyethylene terephthalate of thickness of 25 microns was affixed to the surface of the decorative sheet of the same molding stock as described in Example A-2 to obtain a stack. The stack was press molded under the conditions described in Example C-1 except that the heating time during press molding was 2 minutes. The anti-deviation film described above was peeled off to obtain a thermoplastic resin molded product having a thickness of 0.48 mm.

The resulting thermoplastic resin molded product exhibited a more remarkable embossing effect than that of the molded product described in Example A-2.

Example C-3

An anti-deviation film comprising a polyethylene terephthalate film of a thickness of 25 microns was affixed to the surface of the decorative sheet of the same molding stock as described in Example A-3 to obtain a stack. The stack was press molded under the same conditions as described in Example C-2. The anti-deviation film was peeled off to obtain a sheet-shaped thermoplastic resin molded product having a thickness of 0.13 mm.

The resulting thermoplastic resin molded product exhibited a more remarkable embossing effect than that of the molded product described in Example A-3.

Example C-4

An embossed plate comprising a chrome plated iron plate of a thickness of 2 mm and having on its surface a satin pattern-like fine uneven groups, was affixed to the surface of the PVC film of the same molding stock as described in Example A-4 in such a manner that the surface having the fine uneven groups came into contact with the molding stock. The resulting stack was inserted between hot plates at 150° C., and press molded under an initial pressure of 50 kg/cm$^2$. After 5 minutes, the pressure was reduced to 10 kg/cm$^2$. At this time, water cooling was started and it was continued under the same conditions as described in Example C-1 to obtain a resin molded product.

The resulting resin molded product (i.e., the acrylic decorative laminate) exhibited a more remarkable embossing effect than that of the resin molded product described in Example A-4, and beautiful fine unevenness could be provided on the surface of the resin molded product.

Example C-5

An ink composition containing a mixture of a vinyl chloride-vinyl acetate copolymer and an acrylic resin as a binder was printed on the back surface of a transparent PVC sheet (the thickness of the sheet being 0.33 mm, the content of a plasticizer being 30 PHR and the average polymerization degree ($\bar{P}$) of the PVC resin being 1,100) by a gravure printing method to prepare a decorative sheet.

A pearl clear film obtained by incorporating a pearl essence in a PVC resin (the thickness of the film being 0.1 mm, the content of a plasticizer being 23 PHR, an the average polymerization degree ($\overline{P}$) of the PVC resin) was used as an intermediate resin layer.

PVC resin substrate sheets were as described in Example A-1 except that the thickness thereof was 0.7 mm.

The aforementioned decorative sheet, the intermediate resin layer and the four PVC resin substrate sheets were stacked in this order in such a manner that the printed surface of the decorative sheet was disposed a the inner side thereof. In this manner, two stacks were produced.

A caul (an uppermost layer), a polyethylene terephthalate film, the first stack, a polyethylene terephthalate film, a caul, a polyethylene terephthalate film, the second stack, a polyethylene terephthalate film and a caul (a lowermost layer) were stacked in this order in such a manner that the decorative sheet of the first stack was directed to the upper side, and the decorative sheet of the second stack was directed to the lower side. The stack was inserted between hot plates at 150° C. and press molded in a press under a pressure of 20 kg/cm². After 6 minutes, water cooling was started. The hot plates were cooled to 25° C. At 15 minutes thereafter, cooling was stopped, the stack was removed from the press, and the polyethylene terephthalate film was peeled off. During press molding, the pressure was raised to 30 kg/cm² due to the thermal expansion of the stack, and thereafter returned to 20 kg/cm².

The resulting press molded laminate having a thickness of 3.0 mm exhibited a more remarkable embossing effect than that of the press molded laminate obtained in Example A-1.

Example E-1

A pearl essence was incorporated in a vinyl chloride resin to prepare a white polyvinyl chloride film having a thickness of 0.54 mm and pearl luster. A printing ink composition containing a vinyl chloride-vinyl acetate copolymer/acryl resin binder was printed on the front and back surfaces of the film by an offset printing method to obtain letter print on its front surface and a fine ground tint pattern on its back surface. Thus, a decorative sheet was obtained.

A transparent polyvinyl chloride film having a thickness of 0.1 mm was then affixed to the back surface of the decorative sheet described above. A transparent rigid polyvinyl chloride film of a thickness of 100 microns having on a portion of the front surface thereof a magnetic recording layer of width of 6.5 mm was superposed on the front surface of the decorative sheet described above in such a manner that the back surface of the transparent rigid polyvinyl chloride film came into contact with the front surface of the decorative sheet described above. A polyethylene terephthalate film was superposed on the front surface of the transparent rigid polyvinyl chloride film. The resulting stack was inserted between hot plates at 150° C. using two stainless steel plates as upper and lower cauls, and press molded under an initial pressure of 40 kg/cm². After 10 minutes, the pressure was reduced to 20 kg/cm². At this time, water cooling was started. The hot plates were cooled to 25° C. for 15 minutes to obtain a thermoplastic resin press molded product wherein both upper and lower surfaces thereof were smooth surfaces. On water cooling in the press molding step, the pressing pressure was maintained at 10 kg/cm².

Thereafter, the resulting press molded product was punched into about 54×85 mm rectangular pieces by means of a punching metal mold to obtain plastic cards for certification comprising the magnetic cards wherein both the upper and lower surfaces thereof were smooth surfaces.

In the resulting plastic cards for certification, the front surface thereof was composed of the transparent layers. In the letter printed layer formed via said transparent layers, the printed ink projected toward the front layer of the plastic card in the form of a convex. Further, in the back surface of the cards, the printed ink constituting ground tint patterns projected toward the backside of the plastic card. Thus, the plastic card for certification exhibited an embossing effect tuned with the ink pattern.

Example F-1

A press molded product was produced as in Example A-1 except that ink compositions for forming an ink pattern layer were the following two ink compositions exhibiting different thermal behaviors during pressurization.

First Ink Composition

An ink composition comprising a vehicle consisting of a 10:5 mixture of a vinyl chloride-vinyl acetate copolymer (its ratio being 90/10, and $\overline{P}$ 750)/a methacrylate polymer ($\overline{P}$=400); a pigment; and a solvent.

Second Ink Composition

An ink composition comprising a polyether polyester urethane resin having a molecular weight of 200,000 in a ratio of polyether to polyester of 1:1 as a vehicle and by weight of an isocyanate.

The resulting press molded product exhibited the same effects as described in Example A-1. Further, only the portion of the thermoplastic resin corresponding to the first ink pattern projected upwardly in the form of a convex and thus inner unevenness partially tuned with the ink pattern was formed.

Example F-2

A press molded product was produced as in Example A-3 except that a stained glass-like pattern layer was formed from an ink pattern layer composed of the first ink composition used in Example F-1 and a second ink pattern layer composed of a second ink composition comprising the following components, by a gravure printing method.

| Components | Parts |
|---|---|
| Vinyl chloride-vinyl acetate copolymer (vinyl chloride/vinyl acetate = 90/10, and P = 750) | 10 |
| Methacrylate polymer ($\overline{P}$ = 400) | 5 |
| Titanium white | 15 |
| Pigment | 5 |
| Solvent | 65 |

The resulting press molded product exhibited the same effects as described in Example A-3. Further, only the portion of the thermoplastic resin corresponding to the first ink pattern projected upwardly in the form of a convex, and thus inner unevenness partially tuned with the ink pattern was formed.

What is claimed is:

1. A process for producing a press molded laminate having inner unevenness tuned with an ink pattern, said process comprising the steps of:

applying pressure, to a molding stock obtained by stacking at least two thermoplastic resin layers and an ink pattern layer, in a direction substantially perpendicular to said layers at a heating temperature above the glass transition temperature of said layers at which hot melt behavior of said thermoplastic resin layers is different from that of said ink pattern layer, thereby melting said ink pattern layer and said at least two thermoplastic resin layers at a whole or a part of an interface of said thermoplastic resin layers and vicinity thereof;

compressing said molding stock such that said at least two thermoplastic resin layers flow horizontally to create a surface unevenness in said interface at a location tuned to said ink pattern layer, and to decrease a total thickness of said thermoplastic resin layers from 95% to 40% of a thickness before pressurization to obtain a compressed product; and cooling the compressed product, thereby forming unevenness at the interface of said thermoplastic resin layers tuned with said ink pattern wherein said unevenness can be viewed through at least one surface of said formed laminate.

2. The process according to claim 1 wherein said ink pattern layer of the stacked molding stock is formed from at least two ink compositions wherein their hot melt behaviors during compressing are different from one another.

3. The process according to claim 2 wherein, in order to promote the formation of unevenness tuned with said ink pattern at the interface of said thermoplastic resin layers, said compressing is carried out by means of pressure plates applied directly to surfaces of the molding stock, thereby preventing deviation or misalignment between surfaces of said pressure plates and the surfaces of said molding stock during compressing.

4. The process according to claim 3 wherein deviation or misalignment between the surfaces of said pressure plates and the surfaces of said molding stock during compressing is prevented by interposing a polyester film between the surfaces of said pressure plates and the surfaces of said molding stock.

5. The process according to claim 3 wherein said molding stock is compressed until the total thickness of said thermoplastic resin layers is decreased to from 90% to 40% of the thickness at a start of compressing.

6. The process according to claim 1 wherein, in order to promote the formation of unevenness at the interface of said thermoplastic resin layers tuned with said ink pattern, occurrence of deviation between said thermoplastic resin layers is promoted during compressing.

7. The process according to claim 1 wherein said compressing is carried out by continuously feeding said molding stock between rotating endless belts.

8. The process according to claim 1 wherein the position of the ink pattern layer in said molding stock deviates from a center of the thickness of said molding stock.

* * * * *